Dec. 16, 1924.
G. PRINKE
DIRIGIBLE HEADLIGHT
Filed Feb. 13, 1924
1,519,703
2 Sheets-Sheet 2
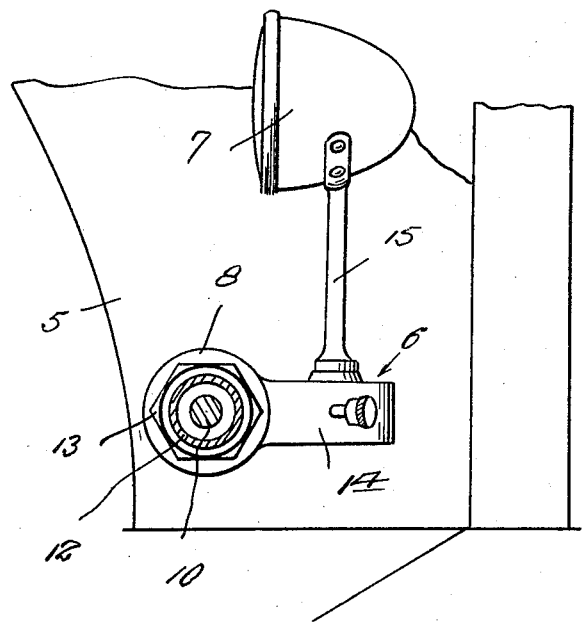
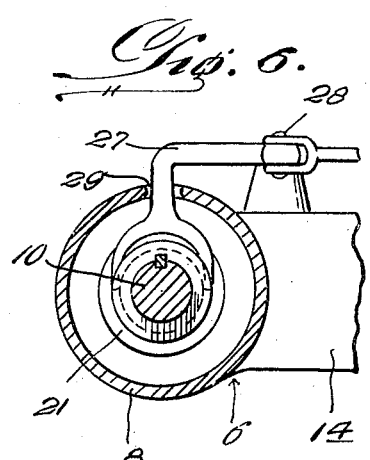
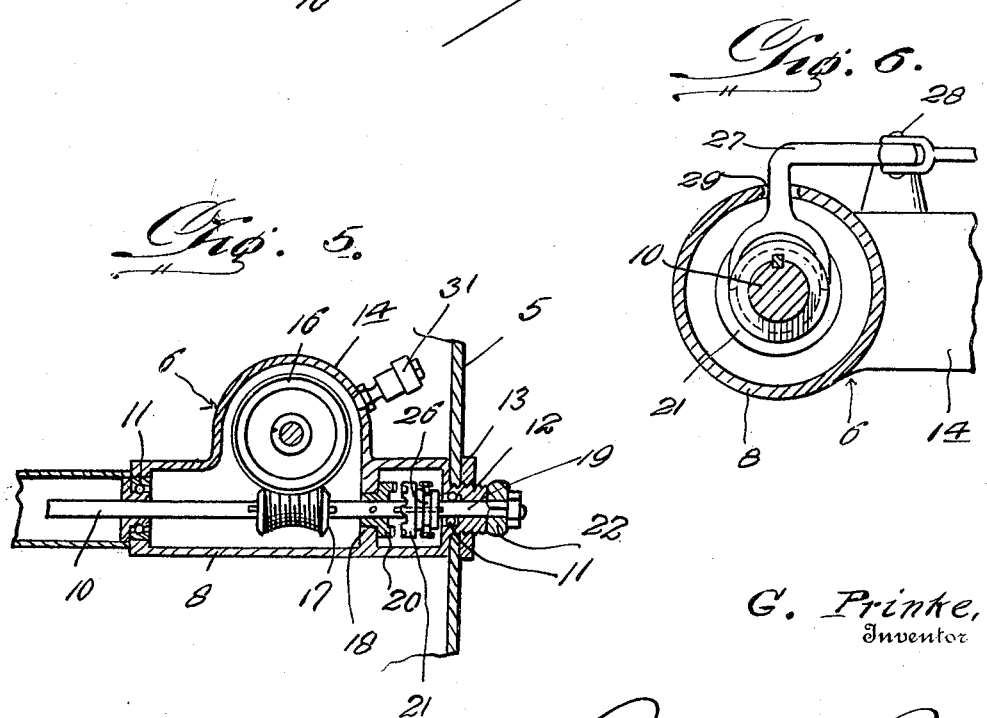
G. Prinke,
Inventor
By Clarence A. O'Brien
Attorney Patented Dec. 16, 1924.

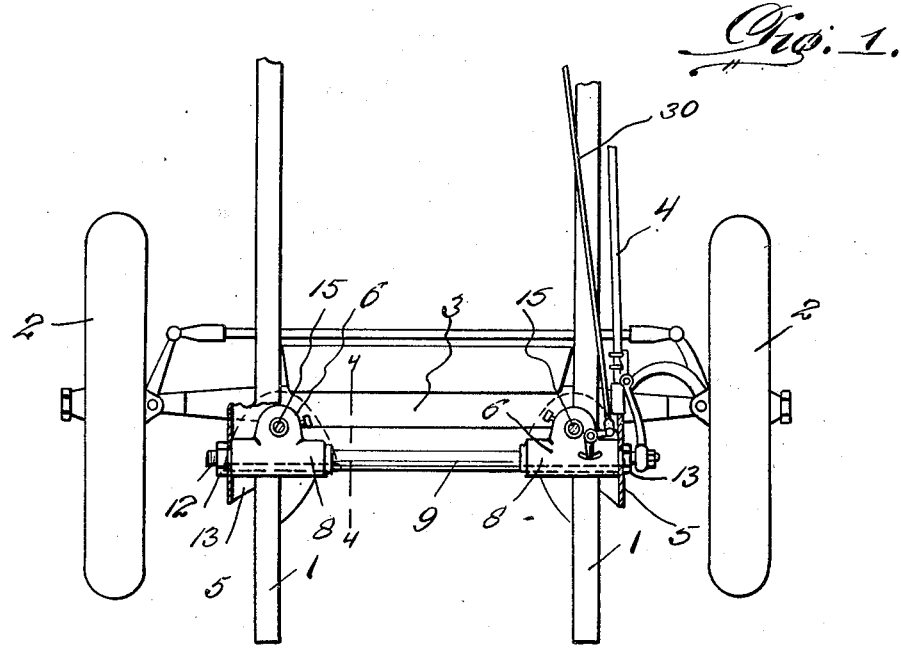
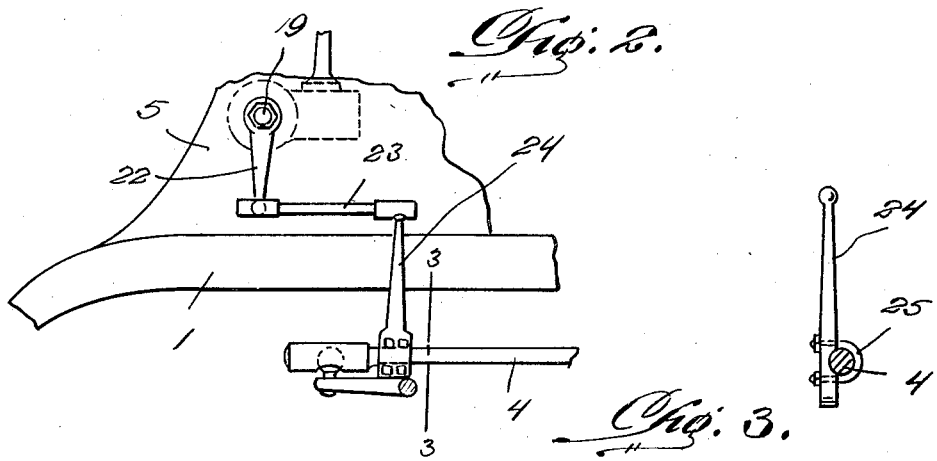

1,519,703

UNITED STATES PATENT OFFICE.

GUST PRINKE, OF BUTTE FALLS, OREGON.

DIRIGIBLE HEADLIGHT.

Application filed February 13, 1924. Serial No. 692,556.

*To all whom it may concern:*

Be it known that I, GUST PRINKE, a citizen of the United States, residing at Butte Falls, in the county of Jackson and State of Oregon, have invented certain new and useful Improvements in Dirigible Headlights, of which the following is a specification.

This invention relates to a new improvement in dirigible headlights for vehicles.

An object of the invention resides in providing a pair of casings adapted to be secured together by a tubular member which holds the casings in spaced relation, the casings and tubular members forming a housing for rotatably mounting the operating shaft having connections in the casings for rotating the lamps mounted thereon, the shafts having a connection beyond the end of one of the casings with the steering mechanism of the vehicle to adapt it to be operated with the steering mechanism.

Another object of the invention is to provide a mounting structure for the headlights of the vehicle including a pair of connecting casings containing operating means for rotating the headlights having a connection beyond the casing with the steering mechanism of the vehicle to effect operation of the lights by the steering mechanism, and means interposed in said connection and within one of the casings adapted to be controlled by the operator of the vehicle to prevent operation of the headlights when desired.

Objects and improvements in the details of construction and arrangement of the parts will be more particularly pointed out in the following description and claims setting forth the preferred construction of the invention, it being understood that slight variations may be made without departing from the spirit and scope of this invention.

In the drawings:

Figure 1 is a plan view of a portion of the front of the vehicle showing the invention applied thereto.

Figure 2 is a detail side view showing the connection between the operating shaft and the steering mechanism of the vehicle.

Figure 3 is a detail view of the arm showing the manner of removably mounting it on the steering rod.

Figure 4 is a sectional view taken on the line 4—4 of Figure 1.

Figure 5 is a horizontal sectional view through one of the casings mounting the headlights.

Figure 6 is a detail view of the manner of operating the clutch collar for disconnecting the operating shaft for operation by the steering gear.

The chassis bars of the vehicle are indicated generally at 1, the front wheels at 2, carried by the axle 3 adapted to be operated for steering the vehicle from the usual steering arm 4 having the usual connection with the steering wheel, all of this structure being of well known form as now in general use. A portion of the fenders of the vehicle is indicated at 5 and which is also of ordinary form.

A pair of casings are indicated at 6, which are adapted to receive and mount the usual headlights 7 of the vehicle so that the same may be rotated with the operation of the steering gear. Each of these casings has a tubular portion 8 with which is connected a tubular member 9 which positions the tubular portions of the casing in alignment with each other and the tubular member for rotatably receiving the operating shaft 10 in bearings 11 mounted in the opposite ends of the tubular portions of said casing. One end of each of said casings is provided at 12 with a reduced threaded extension to receive a nut 13 which is adapted to secure the casing between the fenders 5, the extensions 12 projecting through openings formed in the fenders so that the nuts will cooperate therewith in a manner as clearly shown in Figure 4. Each of the casings 16 are formed with a semi-cylindrical portion 14 adapted to receive the lower end of the lamp post 15 carrying the lamp housing 7 to rotatably mount said post which receives worm gears 16 on the ends thereof which are mounted within the portions 14 of the casing and are adapted to mesh with the worm 17 keyed to the operating shaft 10 so that a rotation of the operating shaft will produce a corresponding rotation of the lamp post.

One of the casings 6 is provided with a partition wall 18 beyond which the end of the operating shaft is provided with a separated section 19, the adjacent end of the operating shaft and the separated section thereof receiving a fixed and movable clutch element respectively as indicated at 20 and 21 respectively for a purpose to be described. The free ends of the separated section 19 extends beyond the reduced extension 12 of the casing to receive an arm 22 on the squared free end thereof. The other end of the arm 22 has a link connection 23 with an operating arm 24 removably connected to the steering rod 4 by a U-bolt connection 25, clearly shown in Figure 3. The movable clutch member of the separated section 19 of the operating shaft is provided with a collar having an annular recess 26 for receiving the forked ends of the shifting levers 27 which is of bell crank formation pivoted as at 28 on the upper side of the casing 16 and having the forked end carried by a depending projection on one end of one of the arms of the lever which extends through an arcuate opening 28 in the upper portion of the tubular section 8 of the casing 6. The other end of the bell crank lever is provided with a link connection 30 which extends into close proximity to the driver's seat of the vehicle so that it may be manually operated by the driver of the vehicle for effecting the engagement of the clutch members to rotate the operating shaft during the operation of the steering gear for turning the headlight with the turning movement of the front wheels of the vehicle, or it may be disconnected to prevent operation of the headlights by the steering gear.

The casings 6 are adapted to receive lubrication through grease cups or other suitable means indicated at 31.

From the above description, it will be clear that the rigid headlight mounting for vehicles has been provided wherein all of the operating parts are housed within communicating casings and which has a connection with the steering mechanism of the vehicle, provided with means for controlling connection operation to prevent rotation of the headlights carried thereby when desired.

What is claimed is:

A dirigible headlight structure comprising a casing having aligned tubular end portions and an intermediately located laterally extending portion, a lamp post mounted for turning movement in the laterally extending portion of the casing, a shaft journaled for rotation in the end portions of the casing, means operatively connecting the shaft with the lamp post, a stub shaft mounted for turning movement in one of the end portions of the casing and being aligned with the said shaft, clutch members carried by the shaft and stub shaft respectively and shifting means mounted upon the intermediate extension of the casing and passing through the side of one of the end portions of the casing and engaging one of the clutch members.

In testimony whereof I affix my signature.

GUST PRINKE.